(12) United States Patent
Sun

(10) Patent No.: US 12,419,269 B2
(45) Date of Patent: Sep. 23, 2025

(54) MULTIFUNCTIONAL CATTLE BED DEVICE

(71) Applicant: Institute of Animal Science, Chinese Academy of Agricultural Sciences, Beijing (CN)

(72) Inventor: Peng Sun, Beijing (CN)

(73) Assignee: Institute of Animal Science, Chinese Academy of Agricultural Sciences, Beijing (CN)

( * ) Notice: Subject to any disclaimer, the term of this patent is extended or adjusted under 35 U.S.C. 154(b) by 0 days.

(21) Appl. No.: 18/732,545

(22) Filed: Jun. 3, 2024

(65) Prior Publication Data
US 2025/0081933 A1    Mar. 13, 2025

(30) Foreign Application Priority Data

Sep. 13, 2023 (CN) .......................... 202311182758.7

(51) Int. Cl.
*A01K 1/015* (2006.01)
(52) U.S. Cl.
CPC .......... *A01K 1/0157* (2013.01); *A01K 1/0158* (2013.01)
(58) Field of Classification Search
USPC ....... 119/526, 436, 450, 451, 458, 508, 509, 119/516, 517, 518, 525, 527, 28.5
See application file for complete search history.

(56) References Cited

U.S. PATENT DOCUMENTS

| | | | | |
|---|---|---|---|---|
| 1,339,089 A | * | 5/1920 | Bascom ............... | A01K 1/0128 119/451 |
| 3,119,373 A | * | 1/1964 | Schmid ............... | A01K 1/0135 119/451 |
| 4,095,561 A | * | 6/1978 | Ruetenik .............. | A01K 15/027 119/700 |
| 6,230,501 B1 | * | 5/2001 | Bailey, Sr. ........... | B60N 2/5685 62/51.1 |
| 8,397,677 B2 | * | 3/2013 | Bruer ................... | A01K 1/0158 119/448 |
| 9,617,040 B1 | * | 4/2017 | Yaniv ..................... | B65D 25/38 |
| 2004/0050338 A1 | * | 3/2004 | Ford ...................... | A01K 31/04 119/437 |

(Continued)

FOREIGN PATENT DOCUMENTS

| | | | | |
|---|---|---|---|---|
| CN | 108935112 | * | 12/2018 | ............... A01K 1/00 |
| EP | 0194730 | * | 9/1986 | ............... A01K 1/12 |

(Continued)

*Primary Examiner* — Andrea M Valenti

(57) ABSTRACT

The disclosure discloses a multifunctional cattle bed device, relates to a technical field of agricultural machinery and includes a cattle bed main body, where the cattle bed main body includes fences, a first cowdung channel, a first scraper, brackets, a cattle bed and a urine guide partition; the cattle bed includes a leaky mattress and a transmission unit; the leaky mattress is connected with the transmission unit; the fences are fixedly connected above two sides of the leaky mattress; the brackets are arranged on both sides of the leaky mattress; one side of the leaky mattress is provided with the first cowdung channel, the first scraper is installed on the first cowdung channel; the leaky mattress is internally provided with the urine guide partition, a thermostatic module, an air purification module, a cleaning module, a drying module, a dung scraping module and a control module.

10 Claims, 13 Drawing Sheets

(56) References Cited

U.S. PATENT DOCUMENTS

2012/0233773 A1* 9/2012 Suzuki .................. A47G 9/0215
                                                              5/423
2015/0216315 A1* 8/2015 Luckemeyer .......... A61G 7/057
                                                              5/423

FOREIGN PATENT DOCUMENTS

| EP | 0728413 | * | 8/1996 | ............... A01K 1/12 |
| KR | 20060132073 | * | 12/2006 | ........... A01K 1/0052 |
| KR | 101860480 | * | 5/2018 | ............... A01K 1/01 |
| TW | M297239 | * | 9/2006 | |

* cited by examiner

MULTIFUNCTIONAL CATTLE BED DEVICE

TECHNICAL FIELD

The disclosure relates to a technical field of agricultural machinery, and in particular to a multifunctional cattle bed device.

BACKGROUND

Beef and dairy cattle are an important part of raising livestock with the continuous development of animal husbandry, the scale of beef and dairy cattle farming is expanding, posing new challenges for improving and optimizing barn environment. The global trends in livestock and poultry breeding are moving toward intensification and intelligence. At present, the commonly used cattle beds are filling-type cattle beds and fixed-type cattle beds. The filling-type cattle bed forms a soft cushion by placing organic substances like straw and sawdust on the ground. While inexpensive and easily installed, they are prone to soaked by cowdung, resulting in high humidity in the cattle bed and inadequate regulation of body temperature, promoting bacteria and parasites growth and increasing the risk of diseases such as hoof disease. The fixed-type cattle bed is a platform made of rubber pads, wooden boards, plastic boards and other materials and fixed on the ground.

Existing cattle bed devices are clean, comfortable and durable, but they are very hard and unsuitable for livestock to lie down for long periods, and it can't automatically adjust the temperature and humidity according to the seasonal and environmental changes, which affects the comfort and yield of cattle. No matter whether it is a filling-type cattle bed or a fixed-type cattle bed, it can't meet the high standard requirements of modern intensive farming for the cattle house environment in beef cattle and dairy farms. Therefore, in order to improve the hygiene and comfort of cattle bed, reduce breeding costs and risks, and promote the health and growth of beef and dairy cows, a multifunctional cattle bed device is needed that can integrate multiple functions such as manure cleaning, intelligent temperature control, intelligent cleaning, automatic deodorization, etc.

SUMMARY

The technical problem solved by the disclosure is the need for a multifunctional cattle bed device that integrates multiple functions, such as manure cleaning, intelligent temperature control, intelligent cleaning, automatic deodorization, etc., to improve the hygiene and comfort of the cattle bed, reduce the breeding cost and risk, and promote the health and growth of beef cattle and dairy cows.

In order to solve the above technical problems, the disclosure provides the following technical scheme: a multifunctional cattle bed device includes a cattle bed main body, where the cattle bed main body includes fences, a first cowdung channel, a first scraper, brackets, a cattle bed and a urine guide partition; the cattle bed includes a leaky mattress and a transmission unit; the leaky mattress is connected with the transmission unit; the fences are fixedly connected above two sides of the leaky mattress; the brackets are arranged on both sides of the leaky mattress; one side of the leaky mattress is provided with the first cowdung channel, the first scraper is installed on the first cowdung channel, and the urine guide partition is arranged inside the leaky mattress;

The leaky mattress is internally provided with a thermostatic module, an air purification module, a cleaning module, a drying module, a dung scraping module and a control module, where the thermostatic module, the air purification module, the cleaning module, the drying module and the dung scraping module are respectively fixedly connected with the inner side of the brackets, and the thermostatic module, the air purification module, the cleaning module and the drying module are respectively connected with the control module.

As an optional scheme of the multifunctional cattle bed device, the thermostatic module includes a first direct-current fan, an electric refrigerating and heating module and a first temperature sensor, where the first direct-current fan, the electric refrigerating and heating module and the first temperature sensor are respectively installed inside the brackets, and the first direct-current fan faces the leaky mattress; the electric refrigerating and heating module is fixedly connected with the first direct-current fan; and the first temperature sensor is located at the air outlet of the first direct-current fan.

As an optional scheme of the multifunctional cattle bed device, the air purification module includes a direct-current suction fan, a filter and a gas sensor, where the direct-current suction fan, the filter and the gas sensor are respectively installed inside the brackets, and the direct-current suction fan faces the leaky mattress, and the direct-current suction fan is fixedly connected with the filter.

As an optional scheme of the multifunctional cattle bed device, the filter includes a machine body, a mesh cover, a primary filter layer, an activated carbon filter layer and a catalyst layer, the direct-current suction fan is fixedly connected with the machine body, and the inner wall of the machine body is fixedly connected with the mesh cover, the primary filter layer, the activated carbon filter layer and the catalyst layer in turn.

As an optional scheme of the multifunctional cattle bed device, the cleaning module includes a flowmeter, a reversing valve, spray guns, a clear water channel and a disinfectant channel, where the flowmeter is installed at an entrance of a water pipe, the reversing valve is installed at a branch of the water pipe, and the spray guns are fixedly connected with the inner side of the brackets.

As an optional scheme of the multifunctional cattle bed device, the drying module includes a second direct-current fan, a heater and a second temperature sensor, where the second direct-current fan, the heater and the second temperature sensor are respectively fixedly connected with the inner side of the brackets, and the second direct-current fan, the heater and the second temperature sensor are located below the urine guide partition, and an air outlet of the second direct-current fan faces the leaky mattress, and the second direct-current fan is fixedly connected with the heater, and the second temperature sensor is located at an air outlet of the second direct-current fan.

As an optional scheme of the multifunctional cattle bed device, the dung scraping module includes a second scraper and a second cowdung channel, the second cowdung channel is arranged inside the leaky mattress, and the inner wall of the second cowdung channel is connected with the second scraper in a sliding way.

As an optional scheme of the multifunctional cattle bed device, the control module includes a central controller, a communication module and a man-machine interface, where the central controller is electrically connected with the communication module and the man-machine interface, and the communication module is electrically connected with the first direct-current fan, the electric refrigerating and heating module, the first temperature sensor, the direct-current suction fan, the gas sensor, the spray guns, the second direct-current fan, the heater, the second temperature sensor and the second scraper respectively.

As an optional scheme of the multifunctional cattle bed device, the central controller is preset with a temperature range threshold and a harmful gas concentration threshold.

As an optional scheme of the multifunctional cattle bed device, the leaky mattress is sprayed with an antibacterial coating.

The disclosure has following beneficial effects: by combining the leaky mattress and the urine guide partition, the separation of feces and urine is realized, and the cattle bed is prevented from being soaked by cowdung, so that the dryness and sanitation of the cattle bed are improved, which is beneficial to the adjustment of the body temperature of cattle and the maintenance of health; by setting constant temperature equipment, air purification equipment, cleaning equipment, dung scraping equipment and drying equipment, the temperature, humidity, smell and other parameters of the cattle bed are automatically adjusted according to the changes of the environment of the cow house and the needs of the cattle, and the comfort and adaptability of the cow house is improved.

The transmission unit drives the mattress to rotate to the lower floor, and the cleaning equipment and the drying equipment clean, disinfect and dry it, thus realizing the automatic cleaning and disinfection functions of the cattle bed, reducing the workload and cost of manual cleaning, and improving the cleaning efficiency and quality.

Spraying antibacterial coating on leaky mattress effectively kills or inhibits bacteria, fungi and other microorganisms, prevents pollution and corruption on the surface of cattle bed, and reduces the incidence of diseases such as mastitis and hoof disease.

Through the first cowdung channel and the ordinary first scraper, the cowdung in the first cowdung channel of the cowshed are regularly removed, so as to avoid the accumulation and odor of manure and improve the sanitary condition of the cowshed environment.

Through sensors, flow meters and reversing valves, the real-time monitoring and adjustment of parameters such as temperature, humidity and harmful gas concentration in the air under the cattle bed are realized, and the parameters such as water output, water pressure and water quality of the cleaning equipment are controlled and switched, so as to ensure the stability and intelligence of the operation of the cattle bed device.

DETAILED DESCRIPTION OF THE EMBODIMENTS

In order to make the above objects, features and advantages of the present disclosure more obvious and understandable, specific embodiments of the present disclosure are described in detail with reference to the attached drawings in the specification. Obviously, the described embodiments are part of the embodiments of the present disclosure, but not all of them.

Embodiment 1

Figure 1:
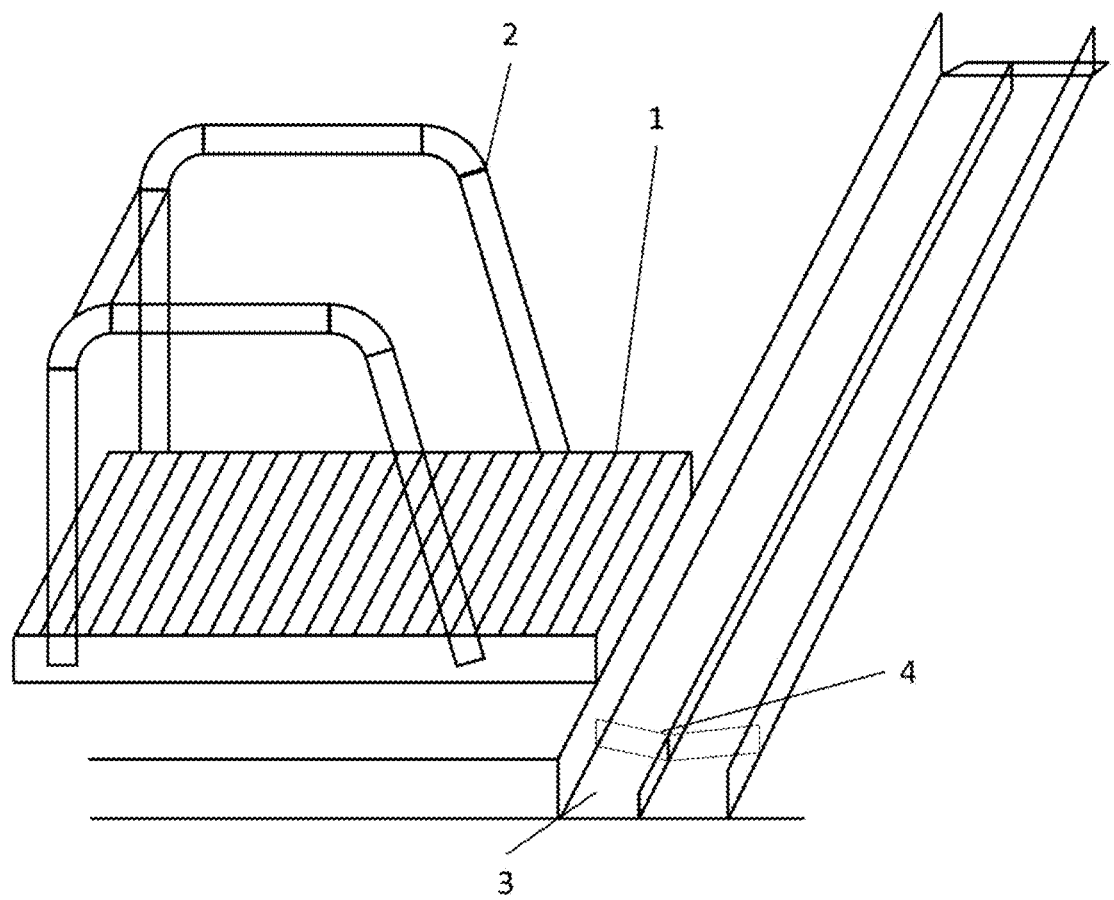
FIG. 1 is a schematic diagram of the present disclosure.
Figure 2:
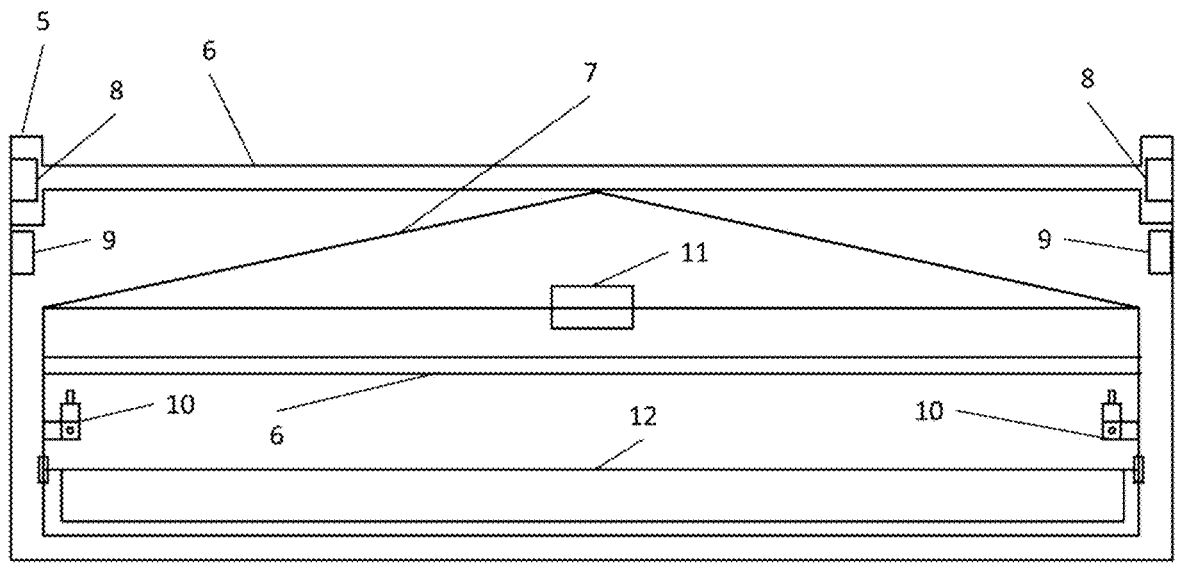
FIG. 2 is a schematic view of a front structure of a cattle bed body in the present disclosure.
Figure 3:
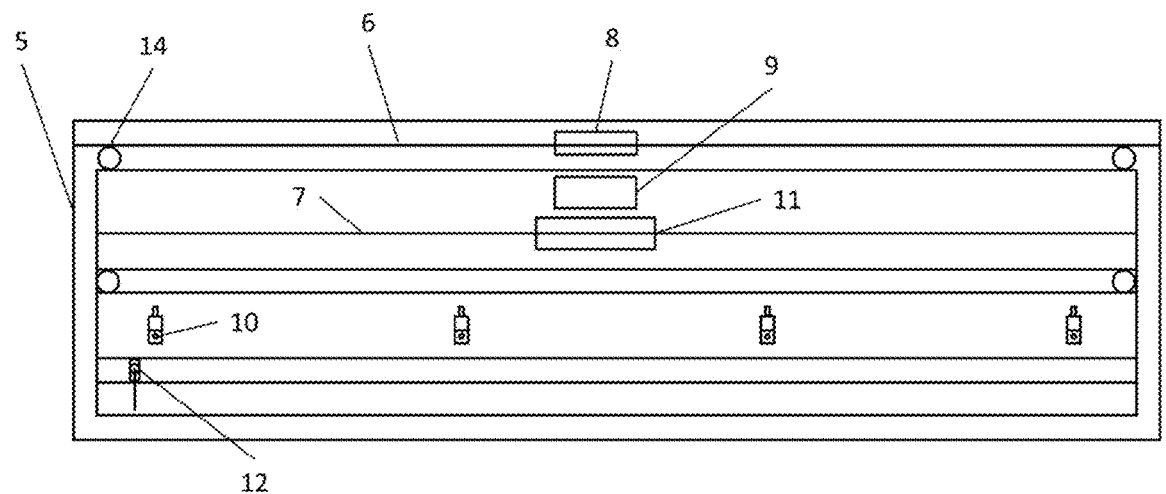
FIG. 3 is a schematic view of a side structure of the cattle bed main body in the present disclosure.
Figure 4:
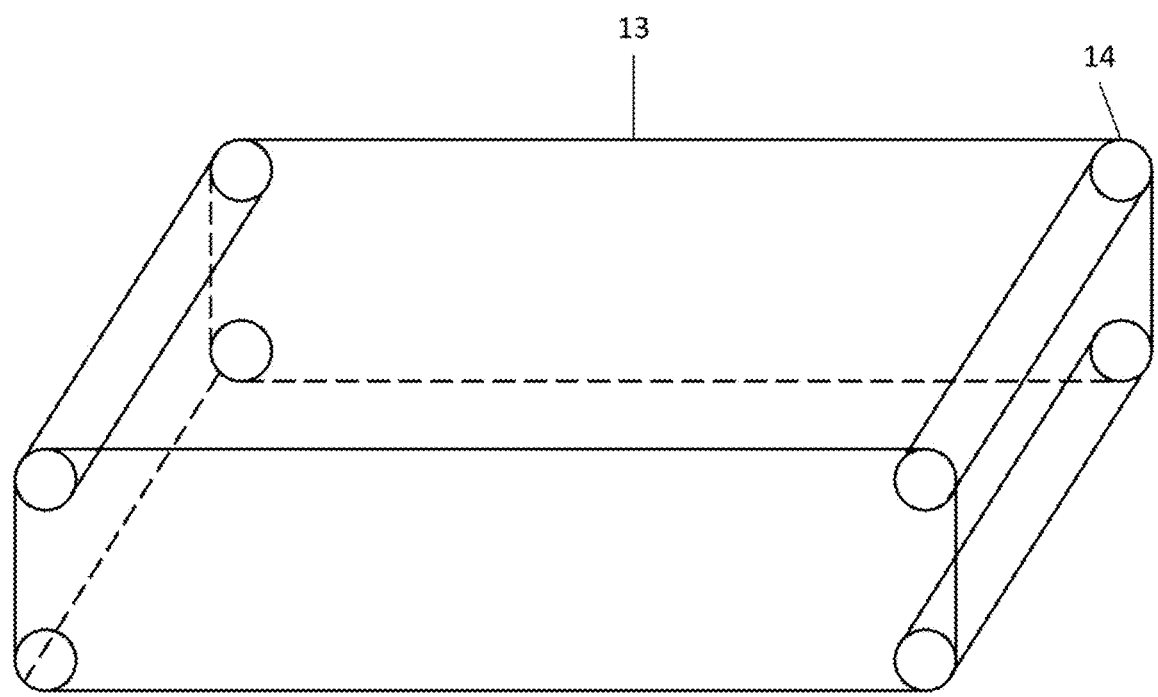
FIG. 4 is a schematic structural diagram of a leaky mattress and a transmission unit of the cattle bed in the present disclosure.
Figure 5:
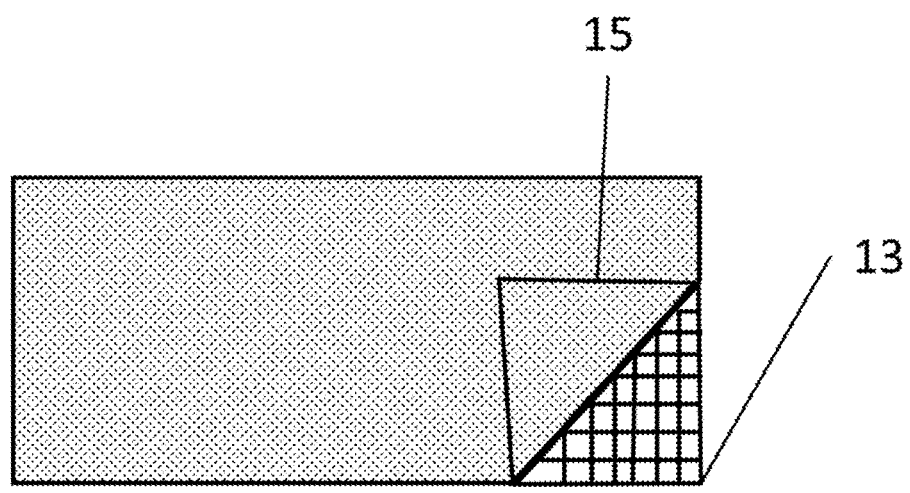
FIG. 5 is a schematic structural diagram of the leaky mattress and an antibacterial coating in the present disclosure.
Figure 6:
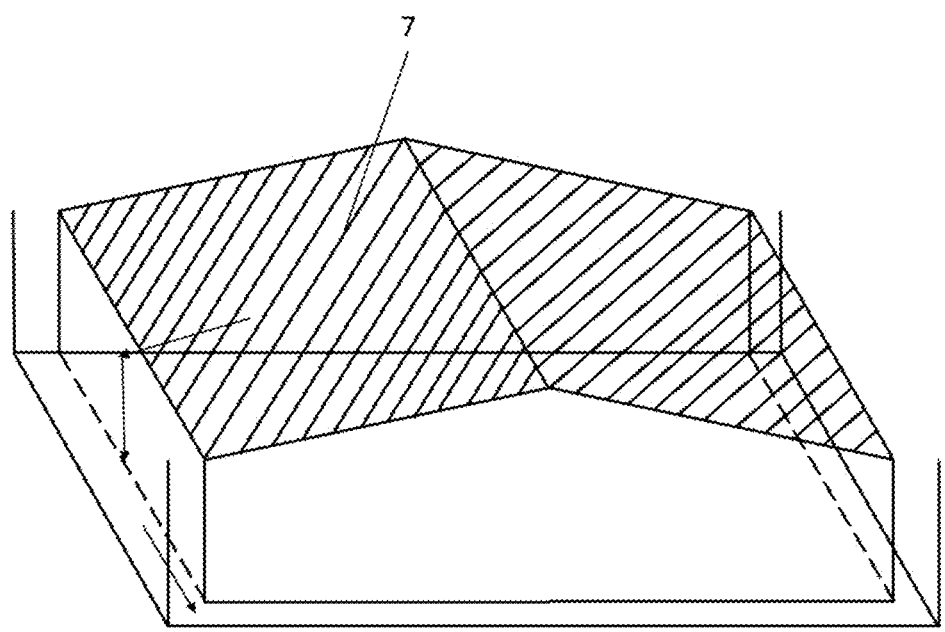
FIG. 6 is a schematic structural diagram of a urine guide partition in the present disclosure.
Figure 7:
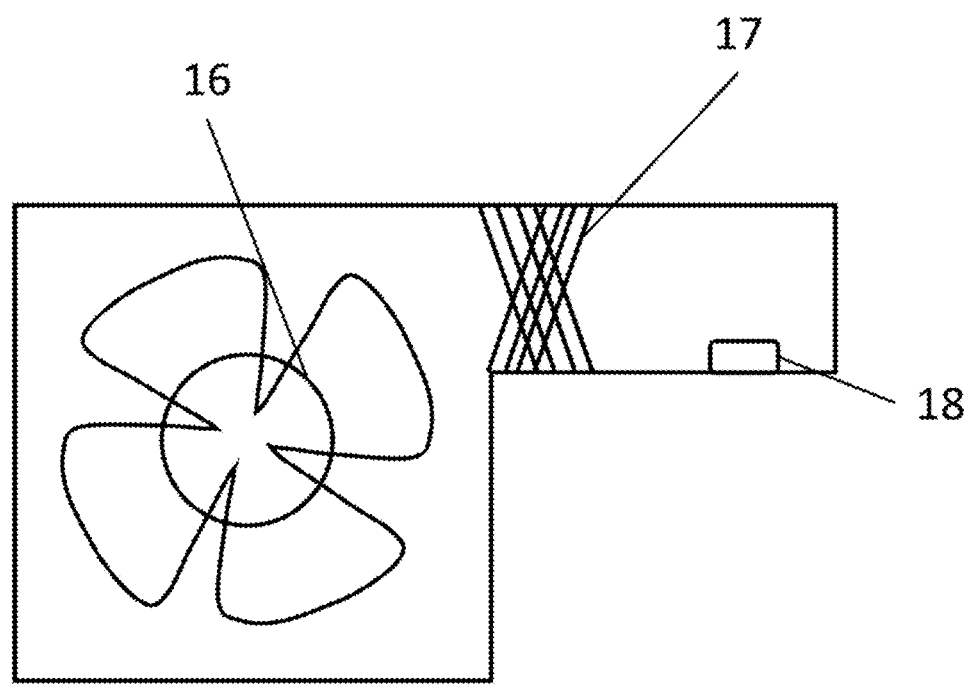
FIG. 7 is a schematic structural diagram of a thermostatic module in the present disclosure.
Figure 8:
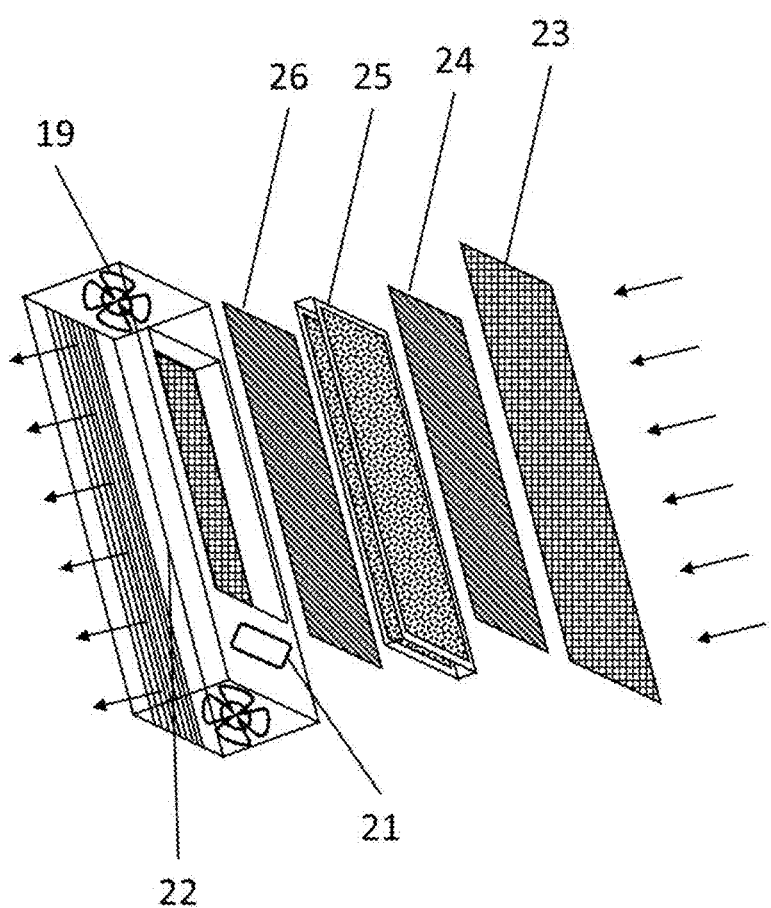
FIG. 8 is a schematic structural diagram of an air purification module in the present disclosure.
Figure 9A:
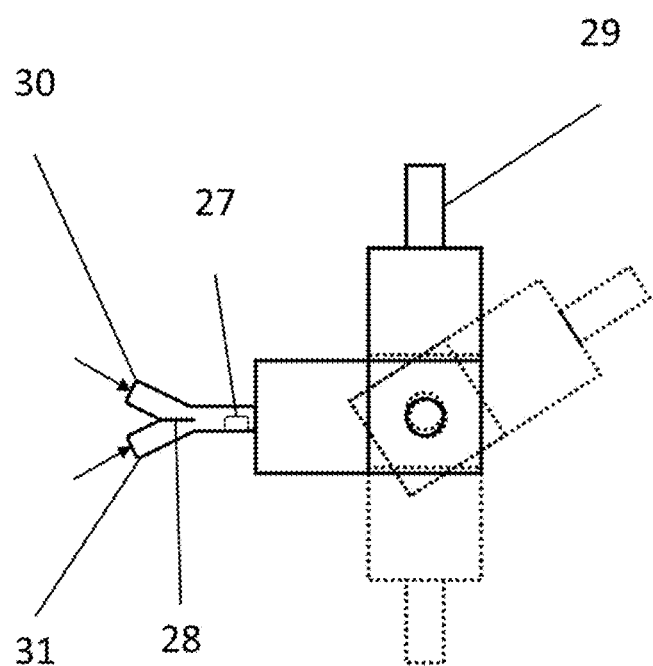
FIG. 9A is a schematic view of a front structure of a cleaning module in the present disclosure.
Figure 9B:
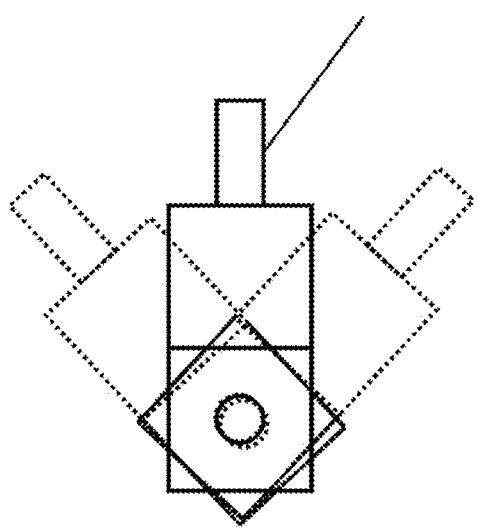
FIG. 9B is a schematic view of a side structure of a cleaning module in the present disclosure.
Figure 10:
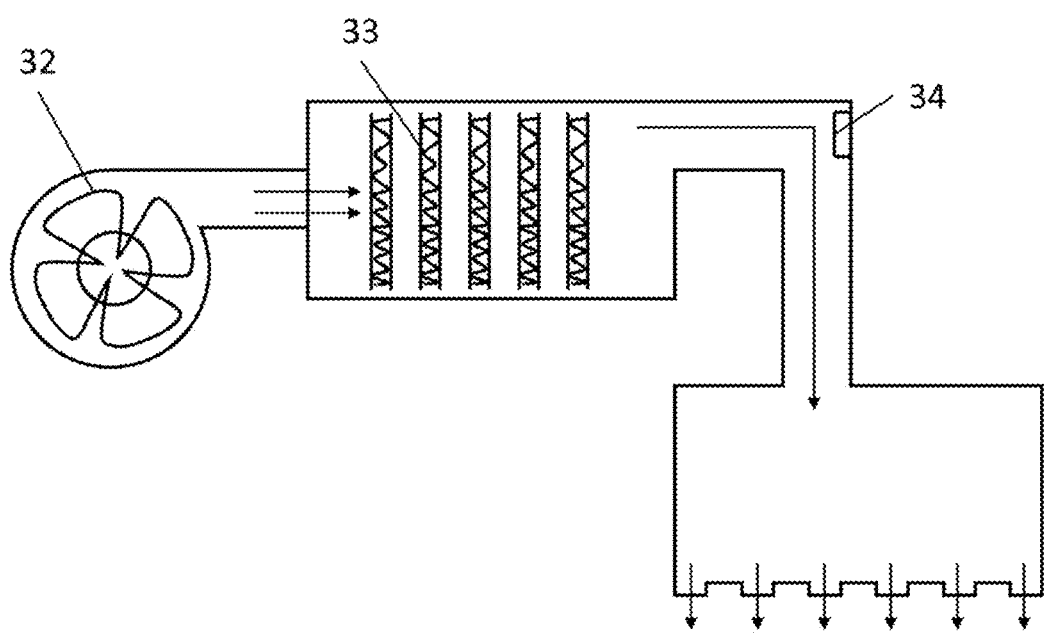
FIG. 10 is a schematic structural diagram of a drying module in the present disclosure.
Figure 11:
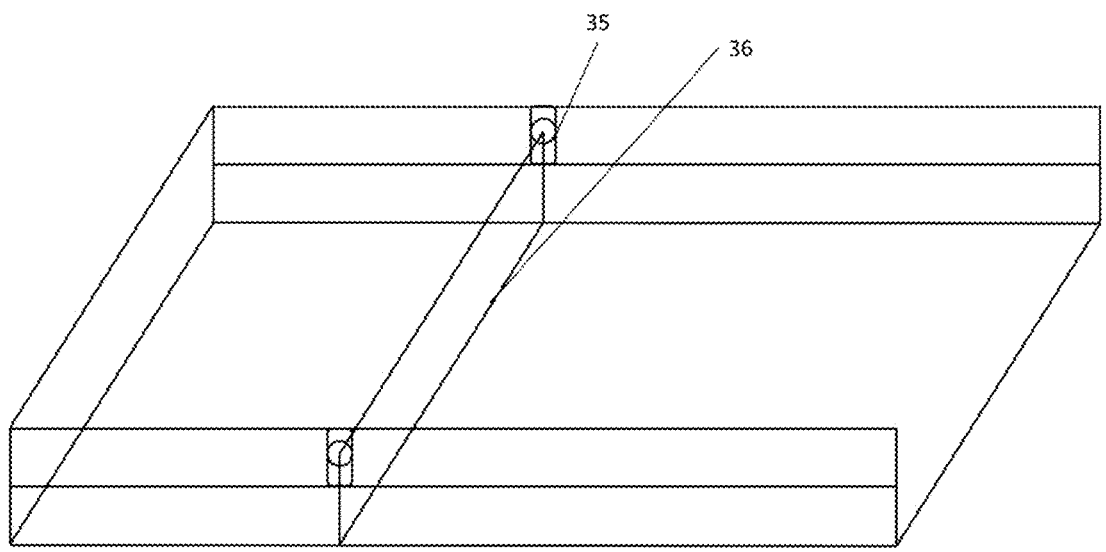
FIG. 11 is a schematic structural diagram of a dung scraping module in the present disclosure.
Figure 12:
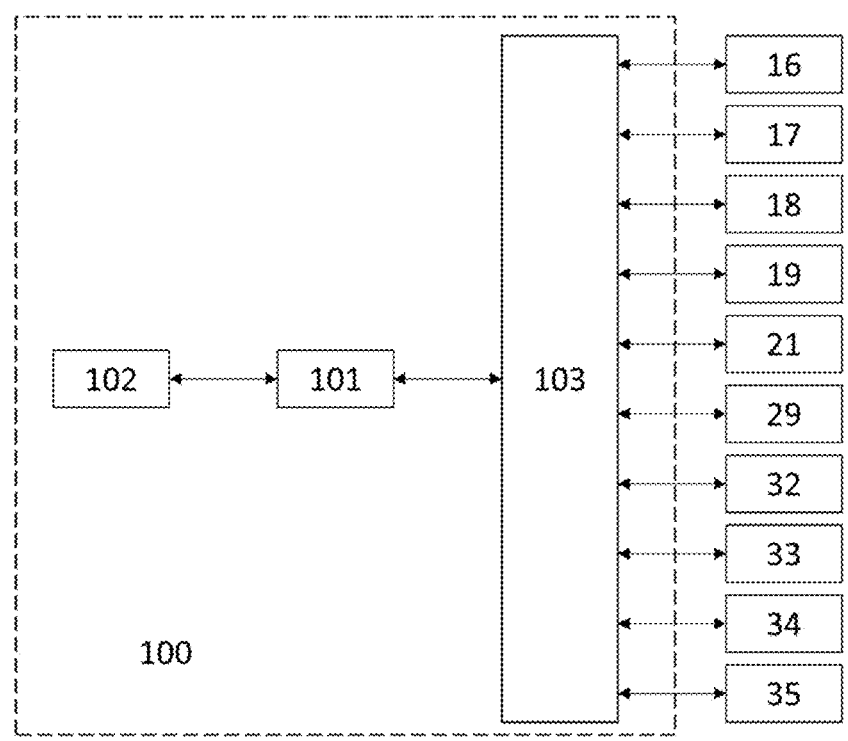
FIG. 12 is a schematic structural diagram of a control module in the present disclosure.

Referring to FIG. 1 to FIG. 2, according to an embodiment of the present disclosure, a multifunctional cattle bed device is provided, which includes a cattle bed main body 1, where the cattle bed main body 1 includes fences 2, a first cowdung channel 3, a first scraper 4, brackets 5, a cattle bed 6 and a urine guide partition 7; the cattle bed includes a leaky mattress 13 and a transmission unit 14, and the leaky mattress 13 is connected with the transmission unit 14, the fences 2 are fixedly connected above two sides of the leaky mattress 13. Two sides of the leaky mattress 13 are provided with the brackets 5, and one side of the leaky mattress 13 is provided with the first cowdung channel 3, a first scraper 4 is installed on the first cowdung channel 3, and the urine guide partition 7 is arranged inside the leaky mattress 13;

the leaky mattress 13 is internally provided with a thermostatic module 8, an air purification module 9, a cleaning module 10 and a drying module 11, a dung scraping module 12 and a control module 100, where the thermostatic module 8, the air purification module 9, the cleaning module 10, the drying module 11 and the dung scraping module 12 are respectively fixedly connected with the inner side of the brackets 5, and the thermostatic module 8, the air purification module 9, the cleaning module 10 and the drying module 11 are respectively connected with the control module 100.

Optionally in this embodiment, the transmission unit 14 uses the existing belt to fixedly connect the bottom of the leaky mattress 13 to the upper surface of the leather belt, and the gap on the leaky mattress 13 is perpendicular to the length direction of the belt, and the transmission unit drives the mattress to rotate to the lower layer for cleaning and disinfection. When the leaky mattress 13 rotates to the edge in the length direction of the belt, the cowdung on the leaky mattress 13 falls into the first cowdung channel 3, and the existing first scraper 4 reciprocates in the first cowdung channel 3, so as to clean and disinfect the first cowdung channel 3. The two sides of the urine guide partition 7 are lower than the middle part, which is beneficial to discharge cow urine. The dung scraping module 12 includes a second scraper 35 and a second cowdung channel 36, and the second cowdung channel 36 is parallel to the length direction of the belt. When the dung scraping module 12 is running, the second scraper 35 will move back and forth at the bottom. When the dirt is transported from the front end of the cattle bed 6 to the rear end of the cattle bed 6, the bottom of the second scraper 35 contacts with the bottom of the cattle bed 6, and the transmission device will rise when running back from the rear end of the cattle bed 6 to the front end of the cattle bed 6, thus preventing the second scraper 36 from bringing the dirt back to the front end of the cattle bed 6.

Further, the thermostatic module 8 is used to adjust the temperature of the cattle bed 6; the air purification module 9 is used to keep the concentration of harmful gas in the air under the cow bed 6 below a safe level; the cleaning module 10 is used to spray clean water, spray disinfectant and stop spraying on the leaky mattress 13, so that the leaky mattress 13 can be effectively cleaned and disinfected; the drying module 11 is used to keep the leaky mattress 13 relatively dry; the control module 100 is used to control the thermostatic module 8, the air purification module 9, the cleaning module 10 and the drying module 11, so as to achieve the purposes of manure cleaning, intelligent temperature control, intelligent cleaning and automatic deodorization, improve the hygiene and comfort of the cattle bed, reduce the breeding cost and risk, and promote the health and growth of beef cattle and dairy cows.

Embodiment 2

Referring to FIGS. 1-12 this embodiment is based on Embodiment 1, and is different from Embodiment 1 in following:

the thermostatic module 8 includes a first direct-current fan 16, an electric refrigerating and heating module 17 and a first temperature sensor 18, where the first direct-current fan 16, the electric refrigerating and heating module 17 and the first temperature sensor 18 are respectively installed inside the brackets 5 and the first direct-current fan 16 faces the leaky mattress 13. The electric refrigerating and heating module 17 is fixedly connected with the first direct-current fan 16, and the first temperature sensor 18 is located at the air outlet of the first direct-current fan 16.

Optionally, in this embodiment, the first direct-current fan 16 faces the leaky mattress 13 to form an air circulation system under the cattle bed 6; the electric refrigerating and heating module 17 is installed in front of the air outlet of the fan, so that the air can be treated by the cooling or heating module 17 before entering the first direct-current fan 16 to reach the target temperature. The first temperature sensor 18 is located near the air outlet, and can detect the actual temperature of the air under the cattle bed, and then send the actual temperature to the control module 100, the control module 100 sends adjustment signals to the first direct-current fan 16 and the electric refrigerating and heating module 17, the first direct-current fan 16 starts ventilation, and the electric refrigerating and heating module 17 heats or cools, so that the actual temperature is close to or equal to the set temperature.

The air purification module 9 includes a direct-current suction fan 19, a filter 20 and a gas sensor 21, the direct-current suction fan 19, the filter 20 and the gas sensor 21 are respectively installed inside the brackets 5, and the direct-current suction fan 19 faces the leaky mattress 13, and the direct-current suction fan 19 is fixedly connected with the filter 20.

Optionally, in this embodiment, the air inlet of the direct-current suction fan 19 is aimed at the lower part of the cattle bed 6 to form an air extraction system under the cattle bed 6. The gas sensor 21 can detect the actual concentration of harmful gas in the air under the cattle bed 6, and then send the actual concentration to the control module 100. The control module 100 sends an adjustment signal to the direct-current suction fan 19 to control the switch of the direct-current suction fan 19, thus making the actual concentration close to or lower than the set concentration.

The filter 20 includes a machine body 22, a mesh cover 23, a primary filter layer 24, an activated carbon filter layer 25 and a catalyst layer 26. The direct-current suction fan 19 is fixedly connected with the machine body 22, and the inner wall of the machine body 22 is fixedly connected with the mesh cover 23, the primary filter layer 24, the activated carbon filter layer 25 and the catalyst layer 26 in turn.

Optionally, in this embodiment, the filter 20 is used to purify the air and keep the concentration of harmful gas in the air under the cattle bed 6 below a safe level.

The cleaning module 10 includes a flowmeter 27, a reversing valve 28, spray guns 29, a clean water channel 30 and a disinfectant channel 31, where the flowmeter 27 is installed at an entrance of a water pipe, the reversing valve 28 is installed at a branch of the water pipe, and the spray guns 29 are fixedly connected with the inner side of the brackets 5.

Optionally, in this embodiment, the reversing valve 28 is installed at the branch of the water pipe for controlling the switch of the clean water channel 30 or the disinfectant channel 31, and switching the supply of clean water and disinfectant to realize the functions of cleaning and disinfection. The spray guns 29 are self-propelled rotary spray guns installed on both sides of the cattle bed 6, and four spray guns 29 are installed on one side at equal intervals to increase the spray range and uniformity to cover all parts of the leaky mattress 13.

The drying module 11 includes a second direct-current fan 32, a heater 33 and a second temperature sensor 34, the second direct-current fan 32, the heater 33 and the second temperature sensor 34 are respectively fixedly connected with the inner side of the brackets 5, and the second direct-current fan 32, the heater 33 and the second temperature sensor 34 are located below the urine guide partition 7, and an air outlet of the second direct-current fan 32 faces the leaky mattress 13, and the second direct-current fan 32 is fixedly connected with the heater 33, and the second temperature sensor 34 is located at an air outlet of the second direct-current fan 32.

Optionally, in this embodiment, the heater 33 is installed in front of the air outlet of the fan, so that the air is treated by the heater 33 before entering the fan to reach the set temperature. The second temperature sensor 34 is located near the air outlet. The second temperature sensor 34 detects the actual temperature of the heated air, and then sends the actual temperature to the control module 100. The control module 100 sends adjustment signals to the second direct-current fan 32 and the heater 33. The second direct-current fan 32 starts ventilation, and the heater 33 starts heating, so that the actual temperature is close to or equal to the set temperature.

The control module 100 includes a central controller 101, a communication module 102 and a man-machine interface 103. The central controller 101 is electrically connected with the communication module 102 and the man-machine interface 103, and the communication module 102 is electrically connected with the first direct-current fan 16, the electric refrigerating and heating module 17, the first temperature sensor 18, the direct-current suction fan 19, the gas sensor 21, the spray guns 29 and the second direct-current fan 32, the heater 33, the second temperature sensor 34 and the second scraper 35 respectively.

Optionally, in this embodiment, the communication module 102 is an industrial field bus interface, which can electrically connect the central controller 101 with the first direct-current suction fan 16, the electric refrigerating and heating module 17, the first temperature sensor 18, the direct-current suction fan 19, the gas sensor 21, the spray guns 29, the second direct-current suction fan 32, the heater 33, the second temperature sensor 34 and the second scraper 35, respectively, to carry out bidirectional data transmission. Information sharing and exchange are realized, and control instructions are sent. A man-machine interface 103 is a touch screen display, which is capable of communicating with the central controller 101 and displaying the running status, parameters and fault information of each module, and is convenient for operators to monitor, operate and manage.

The central controller 101 is preset with a temperature range threshold and a harmful gas concentration threshold.

It is convenient to control the temperature and harmful gas concentration of the cattle bed 6.

An antibacterial coating 15 is sprayed on the leaky mattress 13.

Optionally, in this embodiment, the antibacterial coating 15 is beneficial to inhibit the growth of microorganisms such as bacteria and fungi.

The dung scraping module 12 includes a second scraper 35 and a second cowdung channel 36, and the second cowdung channel 36 is arranged inside the leaky mattress 13, and the inner wall of the second cowdung channel is connected with the second scraper 35 in a sliding way.

Optionally, in this embodiment, the controller 101 sends a start command to the second scraper 35 through the communication module 102, and the second scraper 35 slides on the inner wall of the second cowdung channel 36 to ensure that the dirt can be transported to the first cowdung channel 3. The reason for designing this part is mainly that the leaky mattress 13 will be stained with dirt such as cowdung, which will not easily fall into the first cowdung channel 3 when rotating, and may remain in the lowest layer of the leaky mattress 13 after being washed by the cleaning equipment. In addition, urine, disinfectant, etc. are mixed, which is difficult to clean. Long-term accumulation may lead to equipment blockage, and long-term accumulation of dirt here will lead to an increase in the concentration of harmful gases in the equipment, which will lead to a prolonged operation time of the air purification module 9 and an increase in energy consumption.

Embodiment 3

Referring to FIGS. 1-12, this embodiment is based on Embodiment 2, and is different from Embodiment 2 in following:

According to the obtained actual temperature, the temperature difference is calculated, and according to the magnitude and direction of the temperature difference, an adjustment signal is sent to the first direct-current fan 16 and the electric refrigerating and heating module 17 by the central controller 101, and the first direct-current fan 16 starts ventilation, and the electric refrigerating and heating module 17 performs heating or refrigeration, so that the actual temperature is close to or equal to the set temperature.

During air purification, the central controller 101 calculates the concentration difference according to the preset harmful gas concentration threshold and the actual concentration detected by the sensor 21, and according to the size and direction of the concentration difference, the direct-current suction fan 19 sends an adjustment signal to control the direct-current suction fan 19 to start or stop working, so as to keep the concentration of harmful gas in the air under the cow bed below a safe level.

During cleaning and disinfection, the central controller 101 sends corresponding control signals to the flowmeter 27, the reversing valve 28 and the spray guns 29 according to the preset cleaning and disinfection cycle and time, so that they can spray clean water, spray disinfectant and stop spraying in a certain sequence and time interval, so that the leaky mattress 13 can be effectively cleaned and disinfected.

When drying, the central controller 101 sends corresponding control signals to the heater 33 according to the preset drying temperature and time, so that it can heat at a certain power and time, and sends adjustment signals to the second direct-current fan 32 and the heater 33 according to the actual temperature detected by the second temperature sensor 34. The second direct-current fan 32 starts ventilation, and the heater 33 starts heating, so that the actual temperature is close to or equal to the set temperature, so that the leaky mattress 13 can be properly dried.

During dung scraping, the central controller 101 sends corresponding control signals to the transmission unit according to the preset dung scraping cycle and time, so that it drives the second scraper 35 to reciprocate at the bottom of the cattle bed at a certain speed and direction, thereby transporting the dirt eluted by the cleaning module 10 into the first dung channel 3, and then the first scraper 4 is started, and the first scraper 4 reciprocates in the first dung channel 3, so that the dung in the first dung channel 3 can be cleaned. The two sides of the urine guide partition plate 7 are lower than the middle part, which is beneficial to discharge cow urine.

It should be recognized that embodiments of the present disclosure may be realized or implemented by computer hardware, a combination of hardware and software, or by computer instructions stored in a non-transitory computer-readable memory. The method may be implemented in a computer program using standard programming techniques, including a non-transitory computer-readable storage medium configured with a computer program, where the storage medium so configured causes the computer to operate in a specific and predefined manner, according to the method described in the specific embodiment and the drawings. Each program may be implemented in a high-level procedural or object-oriented programming language to communicate with the computer system. However, if necessary, the program may be implemented in assembly or machine language. In any case, the language may be the language of compilation or interpretation. Furthermore, the program may be run on a programmed application-specific integrated circuit for this purpose.

It should be noted that the above embodiments are only used to illustrate the technical scheme of the present disclosure, but not to limit it. Although the present disclosure has been described in detail with reference to the optional embodiments, those skilled in the art should understand that the technical scheme of the present disclosure may be modified or replaced by equivalents without departing from the spirit and scope of the technical scheme of the present disclosure, which should be included in the scope of the claims of the present disclosure.

What is claimed is:

1. A multifunctional cattle bed device, comprising a cattle bed main body (1), wherein the cattle bed main body (1) comprises fences (2), a first cowdung channel (3), a first scraper (4), brackets (5), a cattle bed (6) and a urine guide partition (7); the cattle bed (6) comprises a mattress (13) and a transmission unit (14), and the mattress (13) is connected with the transmission unit (14), the fences (2) are fixedly connected above two sides of the mattress (13); two sides of the mattress (13) are provided with the brackets (5), and one side of the mattress (13) is provided with the first cowdung channel (3), a first scraper (4) is installed on the first cowdung channel (3), and the urine guide partition (7) is arranged inside the mattress (13);

wherein the mattress (13) is internally provided with a thermostatic module (8), an air purification module (9), a cleaning module (10) and a drying module (11), a dung scraping module (12) and a control module (100), wherein the thermostatic module (8), the air purification module (9), the cleaning module (10), the drying module (11) and the dung scraping module (12) are respectively fixedly connected with an inner side of the brackets (5), and the thermostatic module (8), the air purification module (9), the cleaning module (10) and the drying module (11) are respectively connected with the control module (100); and wherein the cleaning module (10) comprises a flowmeter (27), a reversing valve (28), spray guns (29), a clean water channel (30) and a disinfectant channel (31), wherein the flowmeter (27) is installed at an entrance of a water pipe, the reversing valve (28) is installed at a branch of the water pipe, and the spray guns (29) are fixedly connected with the inner side of the brackets (5).

2. The multifunctional cattle bed device according to claim 1, wherein the thermostatic module (8) comprises a first direct-current fan (16), an electric refrigerating and heating module (17) and a first temperature sensor (18), wherein the first direct-current fan (16), the electric refrigerating and heating module (17) and the first temperature sensor (18) are respectively installed inside the brackets (5) and the first direct-current fan (16) faces the mattress (13); the electric refrigerating and heating module (17) is fixedly connected with the first direct-current fan (16), and the first temperature sensor (18) is located at an air outlet of the first direct-current fan (16).

3. The multifunctional cattle bed device according to claim 2, wherein the air purification module (9) comprises a direct-current suction fan (19), a filter (20) and a gas sensor (21), the direct-current suction fan (19), the filter (20) and the gas sensor (21) are respectively installed inside the brackets (5), and the direct-current suction fan (19) faces the mattress (13), and the direct-current suction fan (19) is fixedly connected with the filter (20).

4. The multifunctional cattle bed device according to claim 3, wherein the filter (20) comprises a machine body (22), a mesh cover (23), a primary filter layer (24), an activated carbon filter layer (25) and a catalyst layer (26); the direct-current suction fan (19) is fixedly connected with the machine body (22), and an inner wall of the machine body (22) is fixedly connected with the mesh cover (23), the primary filter layer (24), the activated carbon filter layer (25) and the catalyst layer (26) in turn.

5. The multifunctional cattle bed device according to claim 3, wherein the drying module (11) comprises a second direct-current fan (32), a heater (33) and a second temperature sensor (34); the second direct-current fan (32), the heater (33) and the second temperature sensor (34) are respectively fixedly connected with the inner side of the brackets (5); the second direct-current fan (32), the heater (33) and the second temperature sensor (34) are located below the urine guide partition (7); an air outlet of the second direct-current fan (32) faces the mattress (13); the second direct-current fan (32) is fixedly connected with the heater (33); and the second temperature sensor (34) is located at an air outlet of the second direct-current fan (32).

6. The multifunctional cattle bed device according to claim 5, wherein the dung scraping module (12) comprises a second scraper (35) and a second cowdung channel (36), and the second cowdung channel (36) is arranged inside the mattress (13), and an inner wall of the second cowdung channel (36) is connected with the second scraper (35) in a sliding way.

7. The multifunctional cattle bed device according to claim 6, wherein the control module (100) comprises a central controller (101), a communication module (102) and a man-machine interface (103); the central controller (101) is electrically connected with the communication module (102) and the man-machine interface (103), and the communication module (102) is electrically connected with the first direct-current fan (16), the electric refrigerating and heating module (17), the first temperature sensor (18), the direct-current suction fan (19), the gas sensor (21), the spray guns (29) and the second direct-current fan (32), the heater (33), the second temperature sensor (34) and the second scraper (35) respectively.

8. The multifunctional cattle bed device according to claim 7, wherein the central controller (101) is preset with a temperature range threshold and a harmful gas concentration threshold.

9. The multifunctional cattle bed device as claimed in claim 1, wherein the mattress (13) is sprayed with an antibacterial coating (15).

10. A multifunctional cattle bed device, comprising a cattle bed main body (1), wherein the cattle bed main body (1) comprises fences (2), a first cowdung channel (3), a first scraper (4), brackets (5), a cattle bed (6) and a urine guide partition (7); the cattle bed comprises a mattress (13) and a transmission unit (14), and the mattress (13) is connected with the transmission unit (14), the fences (2) are fixedly connected above two sides of the mattress (13); two sides of the mattress (13) are provided with the brackets (5), and one side of the mattress (13) is provided with the first cowdung channel (3), a first scraper (4) is installed on the first cowdung channel (3), and the urine guide partition (7) is arranged inside the mattress (13);

wherein the mattress (13) is internally provided with a thermostatic module (8), an air purification module (9), a cleaning module (10) and a drying module (11), a dung scraping module (12) and a control module (100), wherein the thermostatic module (8), the air purification module (9), the cleaning module (10), the drying module (11) and the dung scraping module (12) are respectively fixedly connected with an inner side of the brackets (5), and the thermostatic module (8), the air purification module (9), the cleaning module (10) and the drying module (11) are respectively connected with the control module (100); and wherein the drying module (11) comprises a direct-current fan (32), a heater (33) and a temperature sensor (34), the direct-current fan (32), the heater (33) and the temperature sensor (34) are respectively fixedly connected with the inner side of the brackets (5), and the direct-current fan (32), the heater (33) and the temperature sensor (34) are located below the urine guide partition (7), and an air outlet of the direct-current fan (32) faces the mattress (13), and the direct-current fan (32) is fixedly connected with the heater (33), and the temperature sensor (34) is located at an air outlet of the direct-current fan (32).

\* \* \* \* \*